(12) United States Patent
Takaoka

(10) Patent No.: US 9,061,456 B2
(45) Date of Patent: Jun. 23, 2015

(54) INJECTION-MOLDING MOLD FOR MAKING A RESIN WINDOW PANEL

(71) Applicant: DaikyoNishikawa Corporation, Hiroshima (JP)

(72) Inventor: Tetsuya Takaoka, Hiroshima (JP)

(73) Assignee: DaikyoNishikawa Corporation, Hiroshima (JP)

( * ) Notice: Subject to any disclaimer, the term of this patent is extended or adjusted under 35 U.S.C. 154(b) by 0 days.

(21) Appl. No.: 14/320,800

(22) Filed: Jul. 1, 2014

(65) Prior Publication Data
US 2014/0314901 A1 Oct. 23, 2014

Related U.S. Application Data

(63) Continuation of application No. PCT/JP2012/008276, filed on Dec. 25, 2012.

(30) Foreign Application Priority Data

Jan. 10, 2012 (JP) ................................. 2012-002405

(51) Int. Cl.
| | |
|---|---|
| B29C 45/16 | (2006.01) |
| B29C 45/33 | (2006.01) |
| B29C 45/00 | (2006.01) |
| B29C 45/26 | (2006.01) |
| B29L 31/30 | (2006.01) |

(52) U.S. Cl.
CPC .......... *B29C 45/33* (2013.01); *B29C 2045/2655* (2013.01); *B29C 2045/2646* (2013.01); *B29L 2031/3052* (2013.01); *B29C 45/1635* (2013.01); *B29C 45/2608* (2013.01); *B29C 45/0025* (2013.01); *B29C 2045/0036* (2013.01)

(58) Field of Classification Search
CPC ................ B29C 2045/2655; B29C 2045/2646
USPC ............................. 264/328.7, 328.8; 425/130
See application file for complete search history.

(56) References Cited

U.S. PATENT DOCUMENTS

| | | | |
|---|---|---|---|
| 6,248,281 B1 * | 6/2001 | Abe et al. .................. | 264/328.7 |
| 6,756,004 B2 * | 6/2004 | Davis et al. ................. | 264/255 |
| 2004/0036315 A1 | 2/2004 | Watanabe et al. | |
| 2006/0076710 A1 * | 4/2006 | Rossanese et al. ........... | 264/255 |
| 2007/0018354 A1 | 1/2007 | Bazzo et al. | |

FOREIGN PATENT DOCUMENTS

| | | |
|---|---|---|
| JP | 2003-320548 A | 11/2003 |
| JP | 2007-30511 A | 2/2007 |
| JP | 2009-51183 A | 3/2009 |

OTHER PUBLICATIONS

International Search Report; PCT/JP2012/008276; Apr. 9, 2013.

* cited by examiner

*Primary Examiner* — Tim Heitbrink
(74) *Attorney, Agent, or Firm* — Studebaker & Brackett PC

(57) ABSTRACT

The first sliding molds are movable back and forth in a direction orthogonal to a back-and-forth direction of the movable mold, come into contact with a periphery of the central mold when the first sliding molds move forward to form a first cavity for molding a panel body, and avoid interference with a second sliding mold when the first sliding molds move back to form a second cavity for molding a frame. The second sliding mold is movable back and forth in the back-and-forth direction of the movable mold, allows a forward movement of the first sliding molds when the second sliding mold moves back to form the first cavity, and comes into contact with an inner peripheral edge and an outer peripheral edge of the panel body held on a fixed mold, thereby forming sealing portions, when second sliding mold moves forward to form the second cavity.

3 Claims, 10 Drawing Sheets

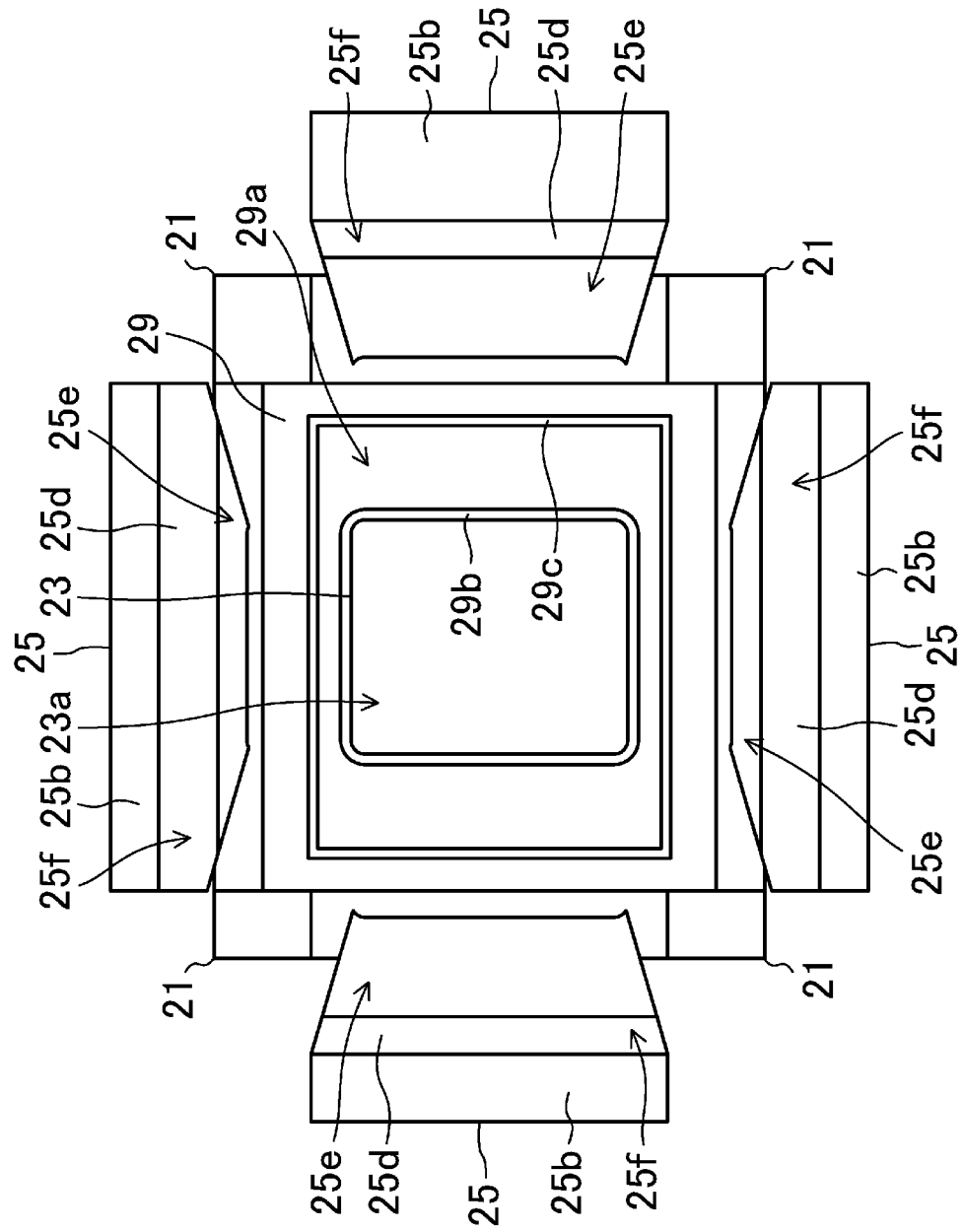

INJECTION-MOLDING MOLD FOR MAKING A RESIN WINDOW PANEL

CROSS-REFERENCE TO RELATED APPLICATIONS

This is a continuation of International Application No. PCT/JP2012/008276 filed on Dec. 25, 2012, which claims priority to Japanese Patent Application No. 2012-002405 filed on Jan. 10, 2012. The entire disclosures of these applications are incorporated by reference herein.

BACKGROUND

The present disclosure relates to injection-molding molds for a vehicle's resin window panel that is injection-molded by a two color molding technique, and specifically relates to measures to reduce the formation of burrs.

Japanese Unexamined Patent Publication No. 2009-51183 discloses injection-molding molds for forming a vehicle's resin window panel which includes a plate-like, transparent panel body, and an annular, opaque frame that is formed integrally with a periphery of the backside of the panel body. The injection-molding mold includes a fixed mold, a first movable mold in the center which faces the fixed mold, a rectangular-frame-shaped second movable mold which is positioned so as to surround the first movable mold and moves forward in the same direction as the forward and backward movement of the first movable mold to form a cavity for molding the panel body together with the fixed mold and the first movable mold, and a third movable mold with which the second movable mold is replaced to form a cavity for molding the frame together with the panel body held on the fixed mold.

SUMMARY

However, the above injection-molding mold is configured such that the second movable mold makes a relative movement with respect to the first movable mold in the same direction, and therefore, a clearance is inevitably formed between the first movable mold and the second movable mold. Since the clearance communicates with the cavity for molding the panel body at the time of formation of the cavity, molten resin flows into the clearance, resulting in formation of burrs on the obtained panel body. Moreover, the injection-molding mold requires additional work to replace the second movable mold with the third movable mold after the formation of the panel body.

The present disclosure is thus intended to provide injection-molding molds for a vehicle's resin window panel which do not require replacement of molds and can reduce the formation of burrs on a panel body.

To achieve the above objective, the present disclosure provides improvement in the structure of a movable mold.

Specifically, the present disclosure is directed to an injection-molding mold for a vehicle's resin window panel which has a panel body made of a transparent or semi-transparent first resin, and an annular frame made of an opaque second resin and formed integrally with a periphery of a back surface side of the panel body, and in which an area surrounded by the frame forms a window. The present disclosure provides the following solution.

That is, the injection-molding mold of the first aspect of the present disclosure includes: a fixed mold which molds a front surface side of the window panel; and a movable mold which faces the fixed mold and is movable back and forth with respect to the fixed mold, and which molds a back surface side of the window panel, wherein the movable mold includes a central mold which molds a back surface side of the panel body corresponding to the window, separate first sliding molds positioned around the central mold, and forming a first cavity for molding the panel body, together with the central mold and the fixed mold, and a second sliding mold positioned so as to surround the central mold, and forming a second cavity for molding the frame, together with the panel body molded in the first cavity and held on the fixed mold, each of the first sliding molds is movable back and forth in a direction intersecting a back-and-forth direction of the movable mold, comes into contact with a periphery of the central mold when the first sliding molds move forward to form the first cavity, and avoids interference with the second sliding mold when the first sliding molds move back to form the second cavity, and the second sliding mold is movable back and forth in the back-and-forth direction of the movable mold, allows a forward movement of the first sliding molds when the second sliding mold moves back to form the first cavity, and comes into contact with an inner peripheral edge and an outer peripheral edge of the panel body held on the fixed mold, thereby forming sealing portions, when the second sliding mold moves forward to form the second cavity.

The second aspect of the present disclosure is that in the first aspect of the present disclosure, each of the first sliding molds includes a sliding mold body in which an engagement recess is formed at a location corresponding to a periphery of the first cavity, and a contact block that is accommodated in the engagement recess while being biased by a biasing means so that the contact block projects from the engagement recess, and when the injection-molding mold is closed due to a forward movement of the movable mold, the contact block is pressed against the fixed mold, thereby increasing an original capacity of the first cavity in the back-and-forth direction of the movable mold, whereas when the injection-molding mold is clamped due to a further forward movement of the movable mold, the contact block is pushed back against a biasing force of the biasing means, thereby reducing the increased capacity of the first cavity to the original capacity of the first cavity.

The third aspect of the present disclosure is that in the second aspect of the present disclosure, an inner peripheral edge of the contact block forms a portion of the first cavity which corresponds to an outer peripheral edge of the back surface side of the panel body.

According to the first aspect of the present disclosure, the separate first sliding molds positioned around the central mold move back and forth in a direction intersecting the back-and-forth direction of the movable mold. The fore end of each of the first sliding mold comes into contact with the outer peripheral surface of the central mold when the first sliding mold moves forward to form the first cavity for molding the panel body. Thus, a clearance is not formed between the first sliding mold and the central mold. Since a clearance which communicates with the first cavity is not formed at the time of formation of the first cavity, the first resin does not flow in between the first sliding molds and the central mold, and it is therefore possible to reduce the formation of burrs on the obtained panel body.

Further, the second sliding mold is moved back to allow the forward movement of the first sliding molds, and in this state, the first sliding molds are moved forward to form the first cavity. The first sliding molds are moved back to avoid interference with the second sliding mold, and in this state, the second sliding mold is moved forward to form the second cavity for molding the frame. Thus, a mold replacement process after the formation of the panel body is not necessary.

Moreover, in the formation of the second cavity, the sealing portions provided at the inner peripheral edge and the outer peripheral edge of the second sliding mold are brought into contact with the panel body held on the fixed mold. The second resin is therefore prevented from flowing inside and outside the second sliding mold. Accordingly, it is possible to reduce burrs on the inner side and the outer side of the frame of the vehicle's resin window panel.

According to the second aspect of the present disclosure, the contact block is accommodated in the engagement recess formed in the sliding mold body at a location corresponding to the periphery of the first cavity. This means that the contact block is smaller than the sliding mold body. Thus, the contact block is less affected by a dimensional change caused by linear expansion associated with changes in mold temperature, and a clearance between the contact block and the sliding mold body into which the contact block is fitted to be able to be smoothly in and out can be set to a minimum value. As a result, the melted first resin does not flow in between the contact block, and the fixed mold and the sliding mold body, and it is possible to reduce the formation of burrs on the periphery of the obtained panel body.

Further, since being biased by the biasing means, the contact block is pressed against the fixed mold earlier than the sliding mold body when the mold is closed to form the first cavity. This results in an increase in capacity of the first cavity, and the contact block forms a portion of the enlarged first cavity which corresponds to the outer peripheral edge of the back surface side of the panel body. After the first resin is injected and fills in the enlarged first cavity, the mold is clamped and the capacity of the first cavity is reduced to its original capacity. As a result, the pressure of the first resin having been injected and filling the cavity is increased. However, the first resin does not flow in between the contact block and the fixed mold since the contact block is biased by the biasing means and pressed against the fixed mold. It is therefore possible to reduce the formation of burrs on the periphery of the panel body molded in the first cavity.

According to the third aspect of the present disclosure, it is possible to reduce the formation of burrs on the periphery of the panel body. If the contact block is provided at a position corresponding to an outer area of the first cavity, and locates at the outer area of the first cavity when the first cavity is formed, the first resin injected in the enlarged first cavity also fills the outer area of the first cavity, and is compressed by the sliding mold body and the fixed mold when the mold is clamped. This may result in formation of burrs on the periphery of the obtained panel body. In contrast, according to the present disclosure, the contact block projects into the first cavity, preventing the first resin from flowing outside the first cavity. It is therefore possible to reduce the formation of burrs on the periphery of the panel body.

BRIEF DESCRIPTION OF THE DRAWINGS

FIG. 5 shows the movable mold in the state of FIG. 4, viewed from the fixed mold side.

DETAILED DESCRIPTION

An embodiment of the present disclosure will be described below, based on the drawings.

Figure 12A:
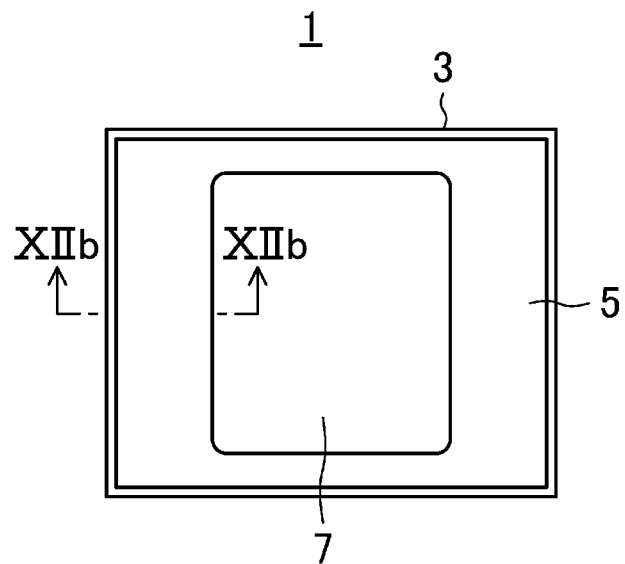
FIG. 12A shows a plan view of a vehicle's resin window panel formed with the injection-molding mold of the present embodiment.
Figure 12B:
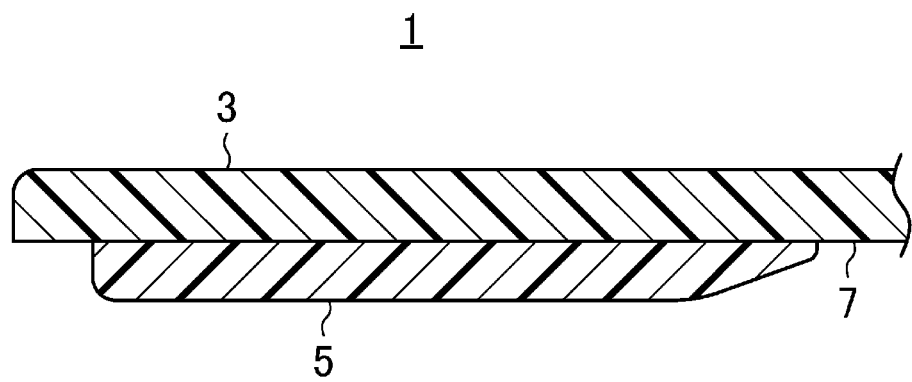
FIG. 12B is a cross-sectional view taken along the line XIIb-XIIb of FIG. 12A.

FIG. 12A shows a vehicle's resin window panel 1. FIG. 12A is a plan view. FIG. 12B is a cross-sectional view taken along the line XIIb-XIIb of FIG. 12A. The window panel 1 is molded by a two color molding technique, and includes a rectangular panel body 3 made of a transparent or semi-transparent first resin R1 (see FIG. 6B and FIG. 7A), and a rectangular annular frame 5 formed integrally with a periphery of a back side of the panel body 3 and made of an opaque second resin R2 (see FIG. 8B). The area surrounded by the frame 5 forms a window 7 of the window panel 1. Further, the frame 5 is formed to be close to a peripheral edge of the panel body 3.

The window panel 1 is formed using the injection-molding mold 9 shown in FIG. 1 to FIG. 4. The injection-molding mold 9 includes a fixed mold 11 attached to a stationary platen (not shown), with a fixed-side attachment plate 15 interposed therebetween, and a movable mold 13 attached to a movable platen (not shown) facing the stationary platen, with a spacer block 17 and a movable-side attachment plate 19 interposed therebetween. The movable platen is supported by tie bars (not shown), which extend from the stationary platen and are inserted in four corner portions of the movable platen. The movable platen is caused to move toward and away from the stationary platen along the tie bars on the actuation of a clamping unit.

Figure 2:
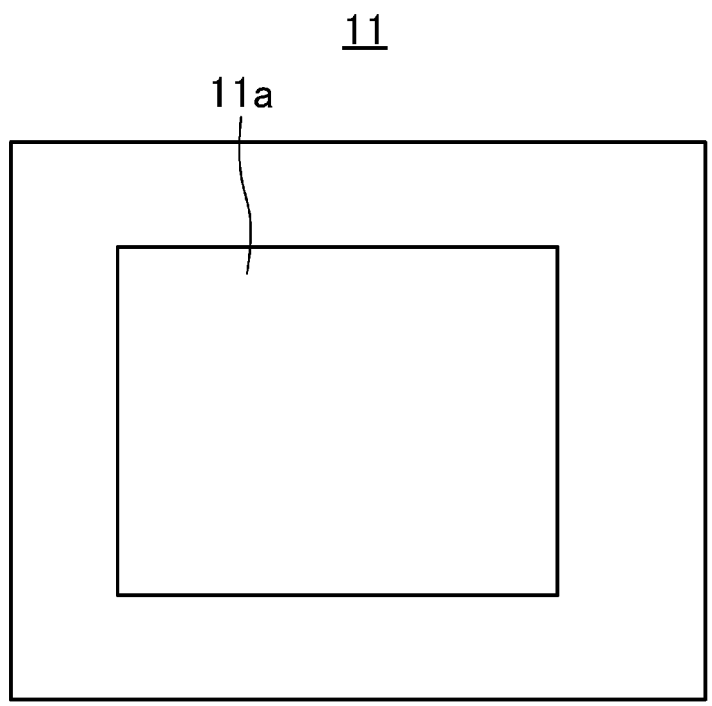
FIG. 2 shows a fixed mold of the injection-molding mold according to the embodiment of the present disclosure, viewed from a movable mold side.
Figure 3:
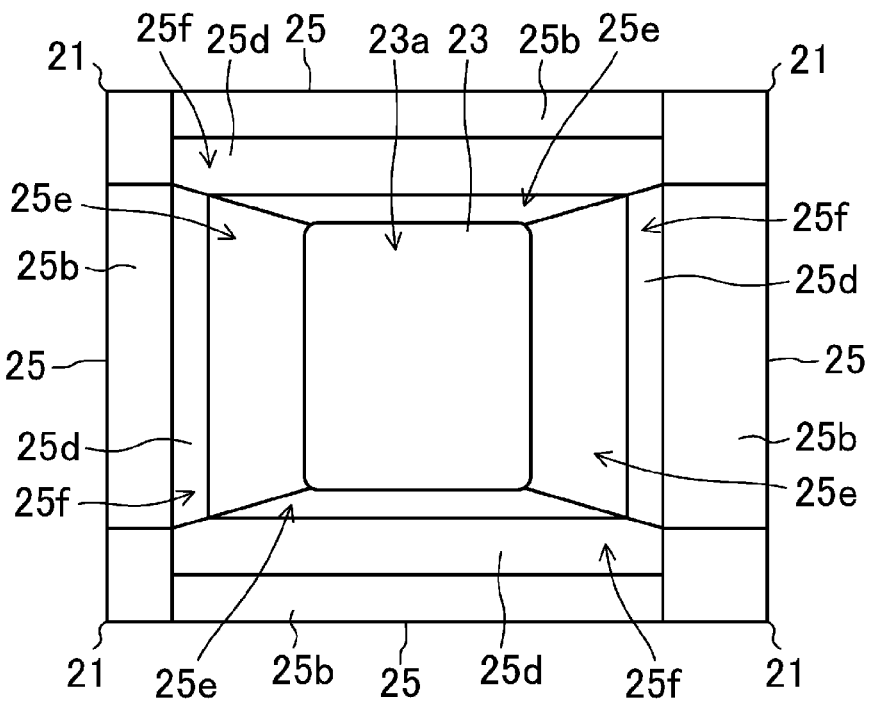
FIG. 3 shows the movable mold in the state of FIG. 1, viewed from the fixed mold side.

FIG. 2 shows the fixed mold 11 viewed from the movable mold 13 side. The fixed mold 11 forms a front surface side of the window panel 1, and has a rectangular molding surface 11a for molding the panel body 3 on a surface facing the movable mold 13.

The movable mold 13 includes a template 21 provided with a template recess 21a that is open toward the fixed mold 11. A rectangular parallelepiped central mold 23 is fixed to a central portion of the template recess 21a. The central mold 23 has a rectangular molding surface 23a for molding a back surface side of the window 7 of the panel body 3, on a surface facing the fixed mold 11.

Four separate first sliding molds 25 are positioned at the fixed mold 11 side of the template recess 21a such that they surround an upper portion of the central mold 23. Each of the first sliding molds 25 move back and forth in a direction orthogonal to the back-and-forth direction of the movable mold 13, by means of a sliding mechanism (not shown) provided on the template 21. Each of the first sliding molds 25 includes a sliding mold body 25b in which an engagement recess 25a is formed at a location corresponding to a periphery of the molding surface 11a of the fixed mold 11. A contact block 25d, which is biased by a spring (a biasing means) 25c (see FIG. 4) and projects from the engagement recess 25a when the mold is open, is accommodated in the engagement recess 25a. The sliding mold body 25a and the contact block 25d respectively have molding surfaces 25e, 25f for forming a back surface side of the panel body 3, on the surfaces facing the fixed mold 11. The molding surface 25f corresponds to an outer peripheral edge of the molding surface 11a of the fixed mold 11. In the state where the mold is closed, with the first sliding molds 25 having moved forward and coming in contact with an outer peripheral surface of the central mold 23, the projecting contact block 25d is in contact with the fixed mold 11, and forms an enlarged first cavity 27 that is larger than the original first cavity 27 for molding the panel body 3, together with the sliding mold body 25b, the central mold 23, and the fixed mold 11. When the movable mold 13 moves further forward, the contact block 25d is pushed back against the biasing force of the spring 25c. As a result, the enlarged first cavity 27 is reduced to the original first cavity 27. The inner peripheral edge of the contact block 25d forms a portion of the first cavity 27 which corresponds to an outer peripheral edge of the back surface side of the panel body 3. The fixed mold 11 is provided with a holding pin (not shown) which holds the panel body 3 molded in the first cavity 27.

Figure 1:
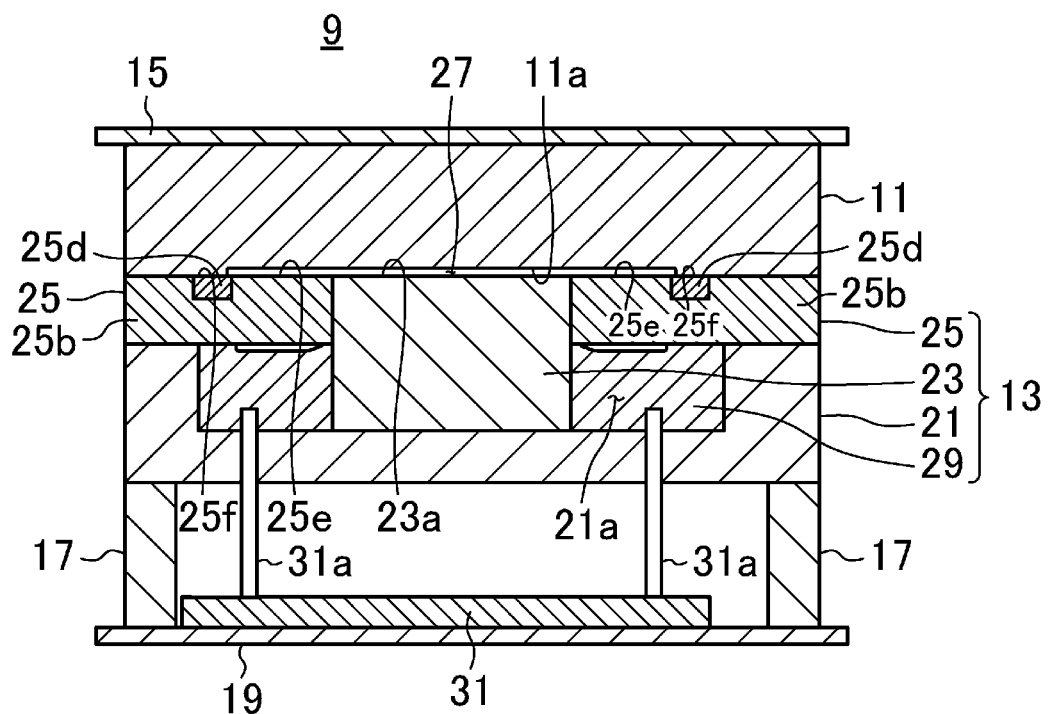
FIG. 1 shows a cross-section of an injection-molding mold according to an embodiment of the present disclosure, in a state where a first cavity is formed.
Figure 4:
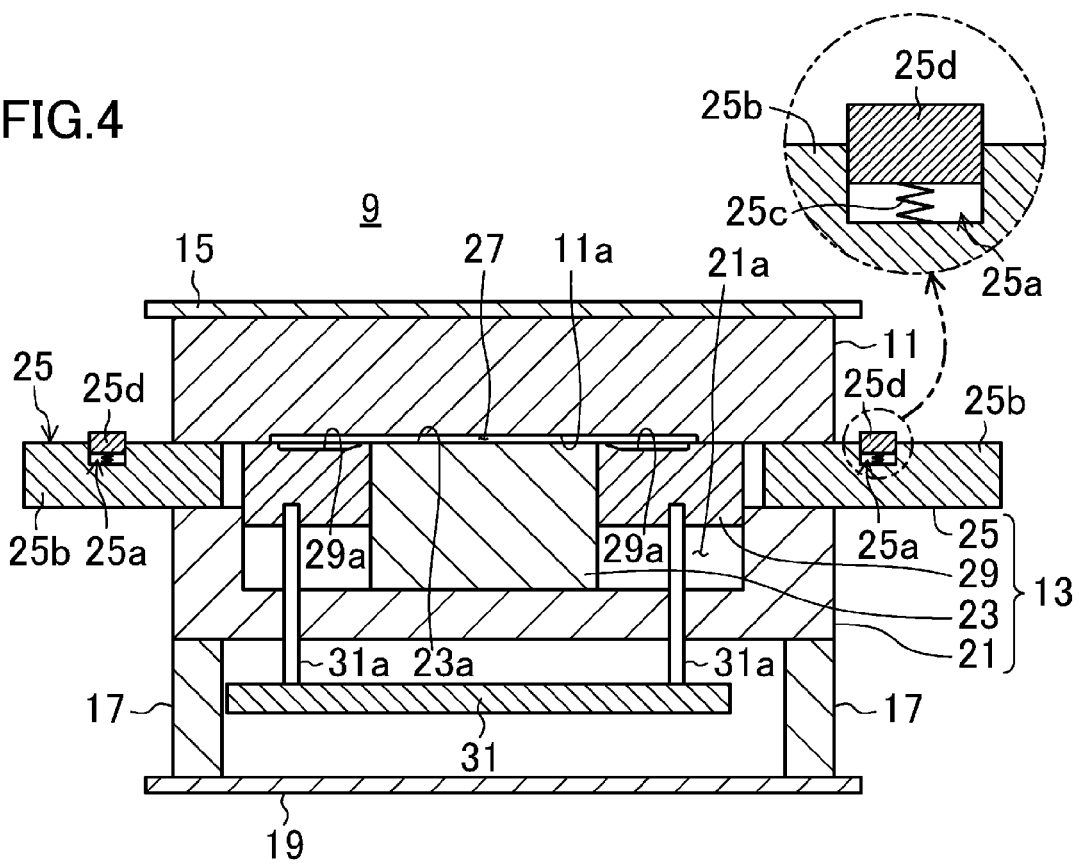
FIG. 4 shows a cross-section of the injection-molding mold according to the embodiment of the present disclosure, in a state where a second cavity is formed.

Further, as shown in FIG. 1, a rectangular annular second sliding mold 29 positioned so as to surround the central mold 23 is accommodated in the template recess 21a in the state where the template recess 21a is closed by the first sliding molds 25 having moved forward. The second sliding mold 29 is coupled, with rods 31a, to a sliding plate 31 positioned in a space surrounded by the template 21 and the spacer block 17. The sliding plate 31 is caused to move back and forth along the back-and-forth direction of the movable mold 13 by a drive mechanism (not shown), thereby making the second sliding mold 29 move back and forth. As shown in FIG. 4, the second sliding mold 29 moves forward in the state where the first sliding molds 25 are moved back to avoid interference with the second sliding mold 29, and the second sliding mold 29 allows the forward movement of the first sliding molds 25 in the state where the second sliding mold 29 is moved back and is accommodated in the template recess 21a. FIG. 5 shows the movable mold 13 in the state of FIG. 4, and is viewed from the fixed mold 11 side. The second sliding mold 29 has a molding surface 29a for molding the frame 5 on a surface facing the fixed mold 11. In the state where the mold is clamped, with the panel body 3 held on the fixed mold 11, the second sliding mold 29 and the panel body 3 form a second cavity 33 for molding the frame 5. The molding surface 29a includes, at an inner peripheral edge and an outer peripheral edge thereof, sealing portions 29b, 29c which come in contact with the back surface side of the panel body 3 at the time of formation of the second cavity 33.

An injection mechanism (not shown) configured to supply the first resin R1 and the second resin R2 is provided on the back side of the stationary platen. A hot runner for the first resin R1 and a hot runner for the second resin R2 (both not shown) are separately provided in the fixed mold 11. A hot runner which communicates with the hot runner for the second resin R2 at the time of formation of the second cavity 33 is provided in the second sliding mold 29 of the movable mold 13. The first resin R1 supplied from the injection mechanism to the first cavity 27 is injected into the first cavity 27 through the hot runner for the first resin R1. The second resin R2 supplied from the injection mechanism to the second cavity 33 is injected into the second cavity 33 through the hot runner provided in the fixed mold 11 for supplying the second resin R2, and the hot runner provided in the second sliding mold 29.

Further, an ejector plate having an ejector pin (both not shown) is provided in a space surrounded by the template 21 and the spacer block 17. The ejector plate is caused to move toward the fixed mold 11 by a drive mechanism (not shown), thereby demolding the molded window panel 1.

Now, a method for molding the window panel 1 using the injection-molding mold 9 will be described with reference to FIG. 6 to FIG. 11.

Figure 6A:
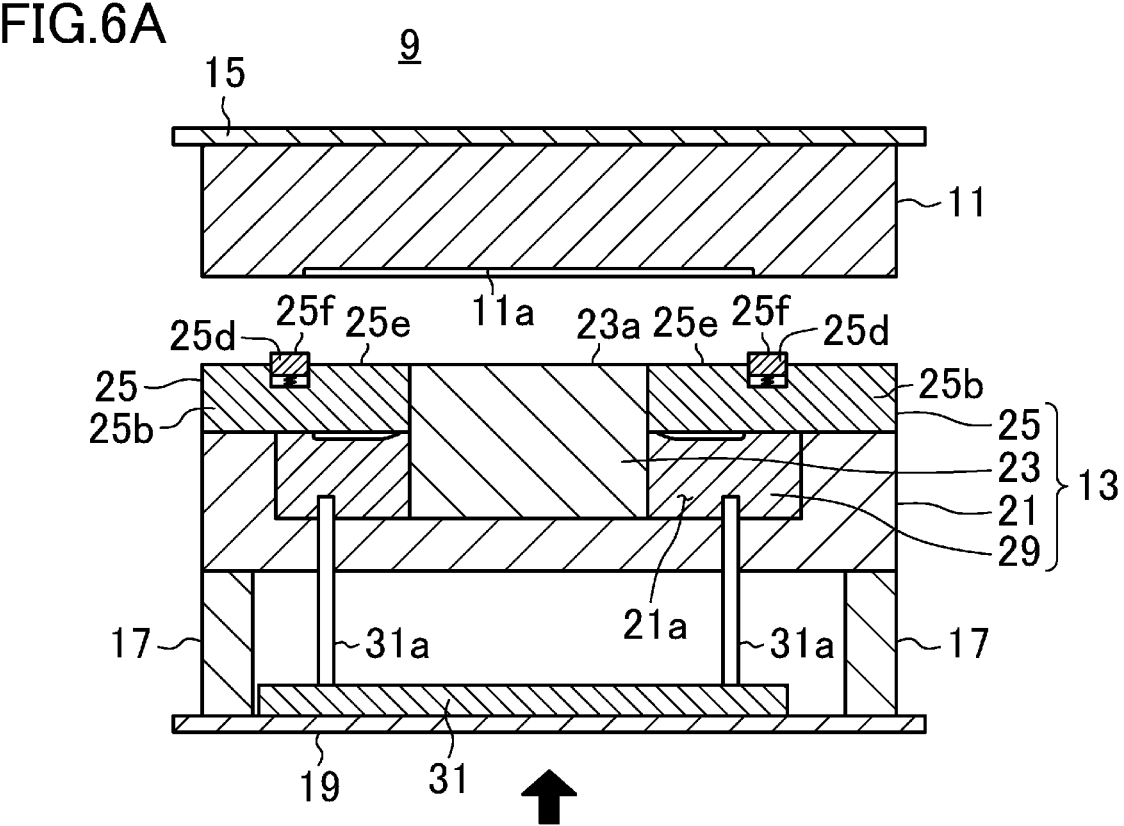
FIG. 6A shows a cross-section of the injection-molding mold which is opened, in a state in which a second sliding mold moves back and a first sliding mold moves forward.

First, as shown in FIG. 6A, the injection-molding mold 9 is opened, and the second sliding mold 29 is moved back to allow a forward movement of the first sliding molds 25. The first sliding molds 25 are then moved forward and brought into contact with the outer peripheral surface of the central mold 23. Since each of the first sliding molds 25 moves forward in a direction orthogonal to the back-and-forth direction of the movable mold 13 and is brought into contact with the outer peripheral surface of the central mold 23, a clearance is not formed between the first sliding molds 25 and the central mold 23.

Next, the injection-molding mold 9 is closed, and the contact block 25d biased by the spring 25c is pressed against the fixed mold 11, thereby forming an enlarged first cavity 27 whose capacity is larger in the back-and-forth direction of the movable mold 13 (i.e., in a thickness direction of the panel body 3) than the capacity of the cavity where the panel body 3 is formed.

Figure 6B:
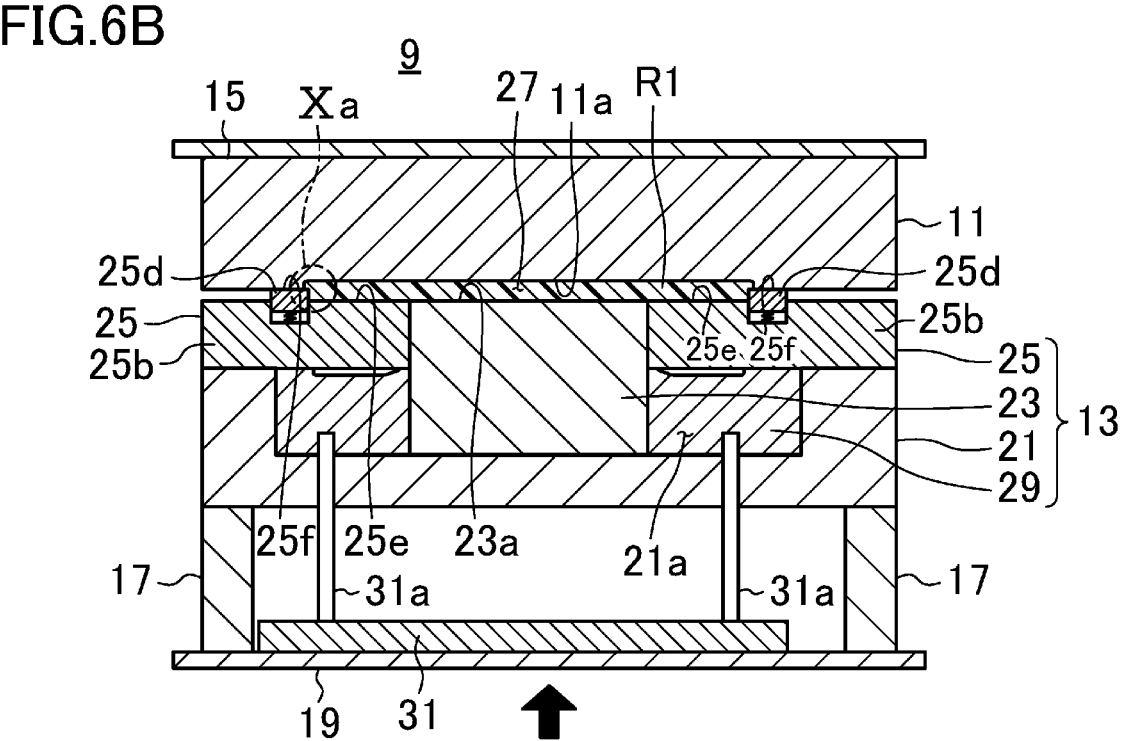
FIG. 6B shows a cross-section of the injection-molding mold which is closed from the state of FIG. 6A and a first resin is injected therein.

Then, as shown in FIG. 6B, a necessary amount of the first resin R1 is injected and fills in the enlarged first cavity 27. Since a clearance is not formed between the first sliding molds 25 and the central mold 23 at this time as described above, the first resin R1 does not flow in between the first sliding molds 25 and the central mold 23. It is therefore possible to reduce the formation of burrs on the back surface side of the obtained panel body 3. Further, since the capacity of the cavity is increased in the thickness direction of the panel body 3, the necessary amount of resin can be easily injected and fill in the first cavity 27 even in the case of using a resin material with low flowability.

Figure 7A:
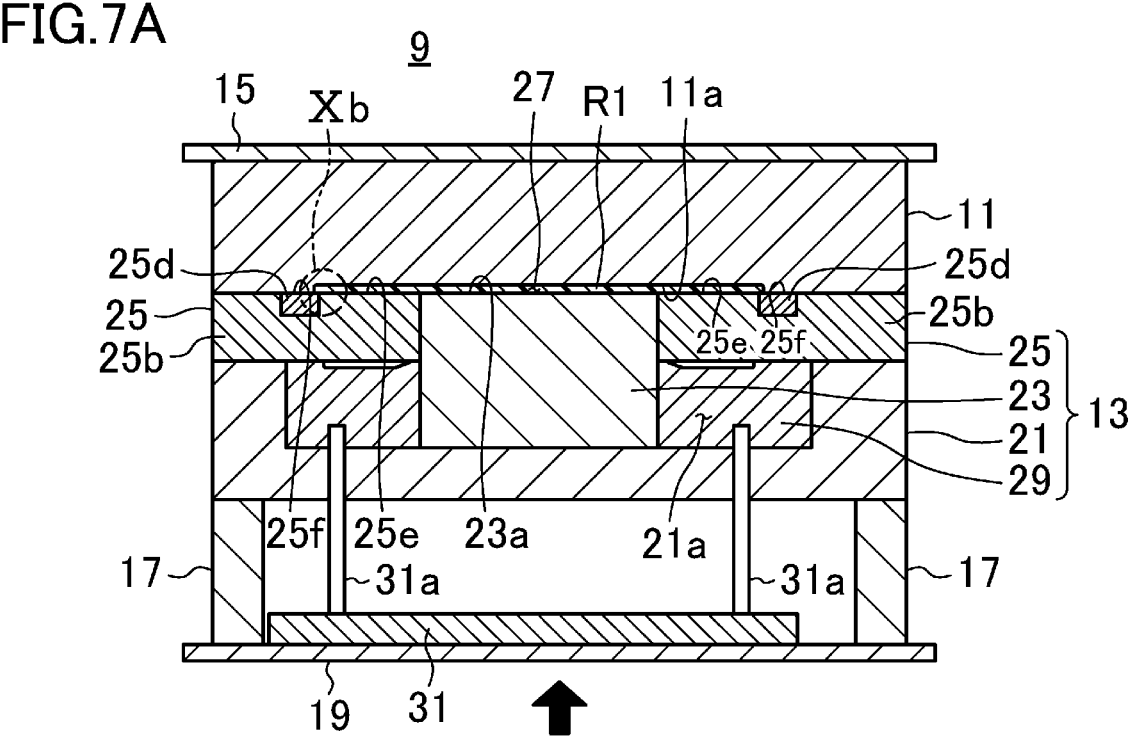
FIG. 7A shows a cross-section of the injection-molding mold which is clamped from the state of FIG. 6B.

Then, as shown in FIG. 7A, the movable mold 13 is caused to move further forward, and the mold is clamped. Here, the contact block 25d is pushed back against the biasing force of the spring 25c, and therefore, the capacity of the enlarged first cavity 27 is reduced to the original capacity of the cavity, and the first resin R1 filling the cavity is compressed.

As a result, the compressive stress of the first resin R1 which is generated during the injection and filling of the resin in the first cavity 27 is balanced, and the panel body 3 without strain is formed.

The first sliding molds 25 are still in contact with the outer peripheral surface of the central mold 23 at this time, and a clearance is not formed between the first sliding molds 25 and the central mold 23. Thus, the first resin R1 does not flow in between the first sliding molds 25 and the central mold 23.

Figure 10A:
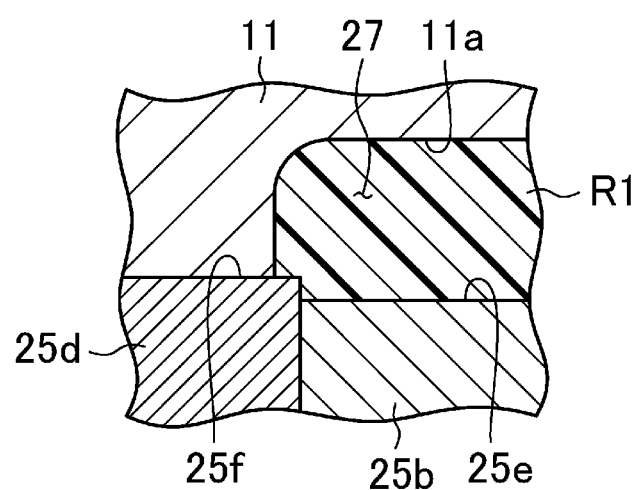
FIG. 10A is an enlarged view of the Xa area in FIG. 6B.
Figure 10B:
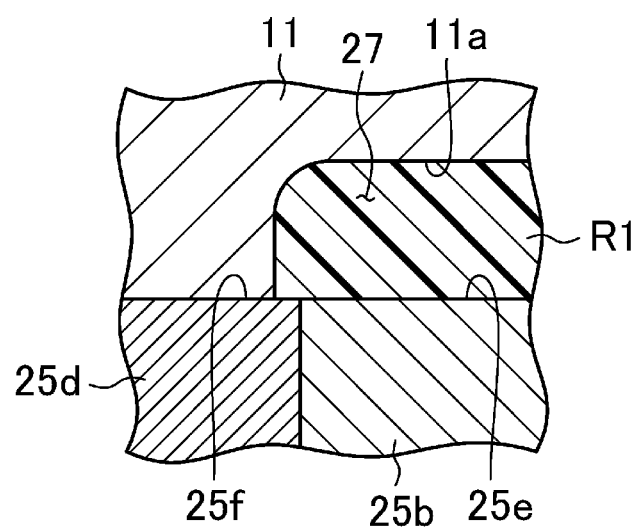
FIG. 10B is an enlarged view of the Xb area in FIG. 7A.

FIG. 10A and FIG. 10B show enlarged cross-sectional views of the outer peripheral edges of the first cavity 27 before and after the compression. Before the compression, the contact block 25d biased by the spring 25c is pressed against the fixed mold 11 earlier than the sliding mold body 25b, which results in an increase in capacity of the first cavity 27, and the contact block 25d forms a portion of the enlarged first cavity 27 which corresponds to the outer peripheral edge of the back surface side of panel body 3. After the first resin R1 is injected and fills in the enlarged first cavity 27, the mold is clamped and the capacity of the first cavity 27 is reduced to its original capacity. This results in an increase in pressure of the first resin R1 having been injected and filling the cavity. However, the first resin R1 does not flow in between the contact block 25d and the fixed mold 11 since the contact block 25d is biased by the spring 25c and pressed against the fixed mold 11. It is therefore possible to reduce the formation of burrs on the periphery of the obtained panel body 3.

Further, the first resin R1 does not flow outside the first cavity 27 since the contact block 25d projects into the first cavity 27. It is therefore possible to reduce the formation of burrs on the periphery of the panel body 3.

Further, the contact block 25d is accommodated in the engagement recess 25a that is formed in the sliding mold body 25b at a location corresponding to the periphery of the first cavity 27. This means that the contact block 25d is smaller than the sliding mold body 25b. Thus, the contact block 25d is less affected by a dimensional change caused by linear expansion associated with changes in mold temperature, and a clearance between the contact block 25d and the sliding mold body 25b which is necessary to enable the contact block 25d to be smoothly in and out of the sliding mold body 25b can be set to a minimum value. As a result, the melted first resin R1 does not flow in between the contact block 25d, and the fixed mold 11 and the sliding mold body 25b. It is possible to further reduce the formation of burrs on the obtained panel body 3.

Figure 7B:
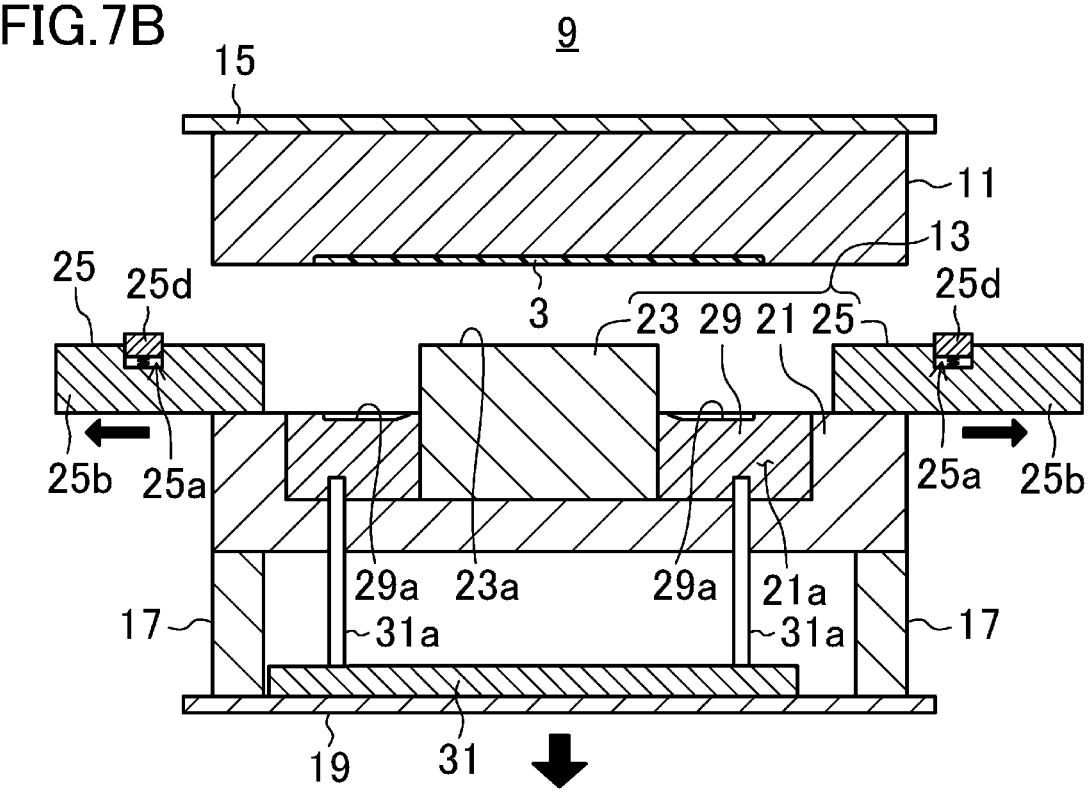
FIG. 7B shows a cross-section of the injection-molding mold which is opened from the state of FIG. 7A, in a state in which the first sliding mold moves back.
Figure 8A:
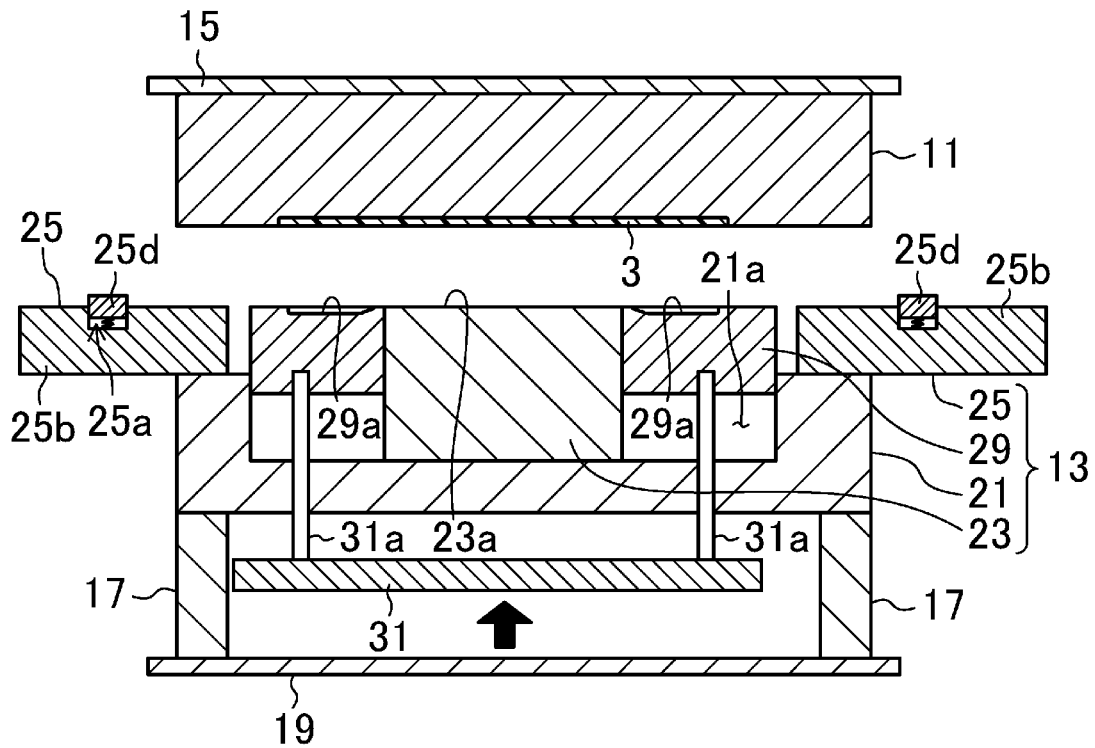
FIG. 8A shows a cross-section of the injection-molding mold in which the second sliding mold moves forward from the state of FIG. 7B.

After the first resin R1 is cooled and solidified, the mold is opened with the obtained panel body 3 held on the fixed mold 11. Each of the first sliding molds 25 is moved back to avoid the interference with the second sliding mold 29 as shown in FIG. 7B, and the second sliding mold 29 is moved forward until its surface facing the fixed mold 11 becomes flush with the surfaces of the first sliding molds 25 facing the fixed mold 11 as shown in FIG. 8A.

Figure 8B:
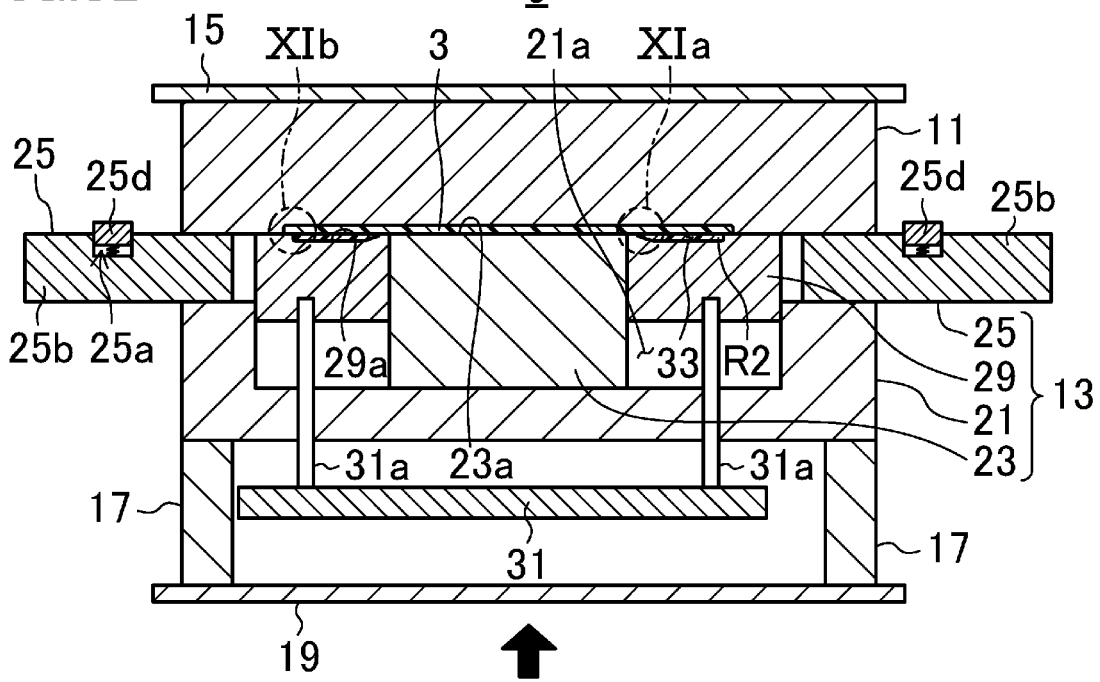
FIG. 8B shows a cross-section of the injection-molding mold which is closed from the state of FIG. 8A and a second resin is injected therein.

Then, the injection-molding mold 9 is clamped to form the second cavity 33 and connect the hot runners in the fixed mold 11 and the second sliding mold 29 together. The second resin R2 is injected and fills in the second cavity 33 as shown in FIG. 8B. As a result, a frame 5 is formed on the back surface of the panel body 3.

Figure 11A:
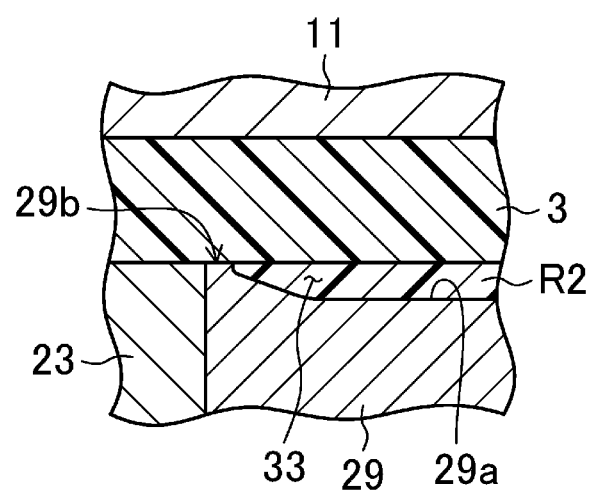
FIG. 11A is an enlarged view of the XIa area in FIG. 8B.
Figure 11B:
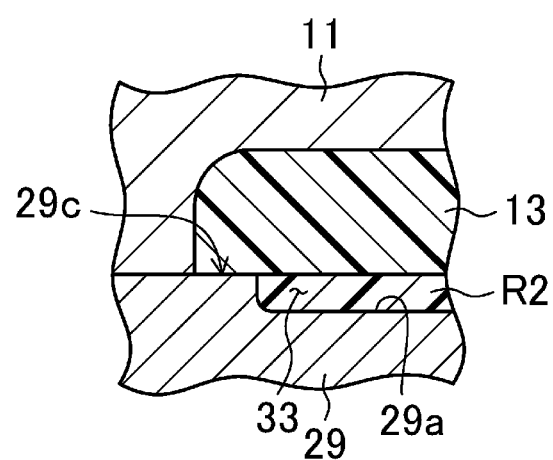
FIG. 11B is an enlarged view of the XIb area in FIG. 8B.

FIG. 11 shows a partially-enlarged view of FIG. 8B. FIG. 11A is an enlarged view of the XIa area. FIG. 11B is an enlarged view of the XIb area. In the formation of the second cavity 33, the sealing portions 29b, 29c formed on the inner peripheral edge and the outer peripheral edge of the second sliding mold 29 are brought into contact with the back surface of the panel body 3 held on the fixed mold 11, thereby preventing the injected second resin R2 from flowing inside and outside the second sliding mold 29. It is therefore possible to reduce burrs on the inner side and outer side of the frame 5 of the window panel 1.

Figure 9:
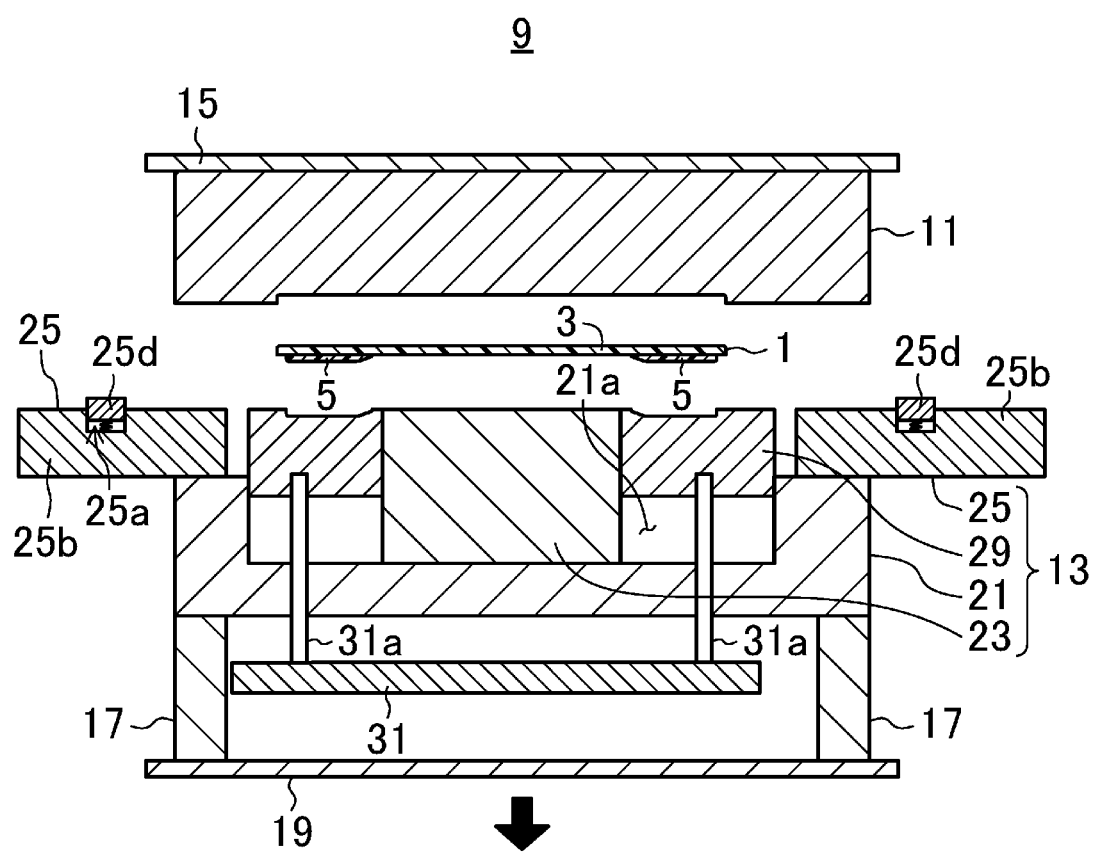
FIG. 9 shows a cross-section of the injection-molding mold which is opened from the state of FIG. 8B, in a state in which a window panel is demolded.

After the window panel 1 is formed by cooling and solidifying the second resin R2, the window panel 1 held on the fixed mold 11 is released from the fixed mold 11. The injection-molding mold 9 is opened thereafter, and the window panel 1 adhering to the movable mold 13 is demolded by making the ejector pin move forward, as shown in FIG. 9.

In the formation of the panel body 3, a small clearance needs to be formed at a joint portion between each of the first sliding molds 25 so that the first sliding molds 25 can come in contact with the central mold 23 without a clearance between the first sliding molds 25 and the central mold 23. This may lead to the formation of burrs at a portion on the back surface of the panel body 3 corresponding to the clearance, but the burrs formed at this portion are covered by the frame 5.

As described above, the injection-molding mold 9 is configured such that the second sliding mold 29 is moved back to allow forward movement of the first sliding molds 25, and in this state, the first sliding molds 25 are moved forward to form the first cavity 27, and such that the first sliding molds 25 are moved back to avoid the interference with the second sliding mold 29, and in this state, the second sliding mold 29 is moved forward to form the second cavity 33. Thus, a mold replacement process after the formation of the panel body 3 is not necessary.

In the above embodiment, each of the first sliding molds 25 includes the contact block 25d, but the first sliding mold 25 is not limited to this structure, and may not include the contact block 25d. However, it is preferable that the first sliding mold 25 includes the contact block 25d in terms of reducing the formation of the burrs on the panel body 3.

The present disclosure is useful as an injection-molding mold for a vehicle's resin window panel that is injection-molded by a two color molding technique, and specifically suitable as an injection-molding mold that reduces the formation of burrs.

What is claimed is:

1. An injection-molding mold (9) for making a vehicle resin window panel (1) which has a panel body (3) made of a transparent or semi-transparent first resin (R1), and an annular frame (5) made of an opaque second resin (R2) and formed integrally with a periphery of a back surface side of the panel body (3), and in which an area surrounded by the frame (5) forms a window (7), the injection-molding mold (9) comprising:

a fixed mold (11) which molds a front surface side of the window panel (1); and a movable mold (13) which faces the fixed mold (11) and is movable back and forth with respect to the fixed mold (11), and which molds a back surface side of the window panel (1), wherein the movable mold (13) includes
a central mold (23) which molds a back surface side of the panel body (3) corresponding to the window (7),
separate first sliding molds (25) positioned around the central mold (23), and forming a first cavity (27) for molding the panel body (3), together with the central mold (23) and the fixed mold (11), and
a second sliding mold (29) positioned so as to surround the central mold (23), and forming a second cavity (33) for molding the frame (5), together with the panel body (3) molded in the first cavity (27) and held on the fixed mold (11), each of the first sliding molds (25) is movable back and forth in a direction intersecting a back-and-forth direction of the movable mold (13), comes into contact with a periphery of the central mold (23) when the first sliding molds (25) move forward to form the first cavity (27), and avoids interference with the second sliding mold (29) when the first sliding molds (25) move back to form the second cavity (33), and the second sliding mold (29) is movable back and forth in the back-and-forth direction of the movable mold (13), allows a forward movement of the first sliding molds (25) when the second sliding mold (29) moves back to form the first cavity (27), and comes into contact with an inner peripheral edge and an outer peripheral edge of the panel body (3) held on the fixed mold (11), thereby forming sealing portions (29*b*, 29*c*), when the second sliding mold (29) moves forward to form the second cavity (33).

2. The injection-molding mold (9) of claim 1, wherein each of the first sliding molds (25) includes a sliding mold body (25*b*) in which an engagement recess (25*a*) is formed at a location corresponding to a periphery of the first cavity (27), and a contact block (25*d*) that is accommodated in the engagement recess (25*a*) while being biased by a biasing means (25*c*) so that the contact block (25*d*) projects from the engagement recess (25*a*), and when the injection-molding mold (9) is closed due to a forward movement of the movable mold (13), the contact block (25*d*) is pressed against the fixed mold (11), thereby increasing an original capacity of the first cavity (27) in the back-and-forth direction of the movable mold (13), whereas when the injection-molding mold (9) is clamped due to a further forward movement of the movable mold (13), the contact block (25*d*) is pushed back against a biasing force of the biasing means (25*c*), thereby reducing the increased capacity of the first cavity (27) to the original capacity of the first cavity (27).

3. The injection-molding mold of claim 2, wherein an inner peripheral edge of the contact block (25*d*) forms a portion of the first cavity (27) which corresponds to an outer peripheral edge of the back surface side of the panel body (3).

\* \* \* \* \*